United States Patent
Basir et al.

(10) Patent No.: US 8,364,486 B2
(45) Date of Patent: Jan. 29, 2013

(54) SPEECH UNDERSTANDING METHOD AND SYSTEM

(75) Inventors: Otman A. Basir, Waterloo (CA); William Ben Miners, Guelph (CA)

(73) Assignee: Intelligent Mechatronic Systems Inc., Waterloo (CA)

( * ) Notice: Subject to any disclaimer, the term of this patent is extended or adjusted under 35 U.S.C. 154(b) by 993 days.

(21) Appl. No.: 12/402,874

(22) Filed: Mar. 12, 2009

(65) Prior Publication Data

US 2009/0234651 A1    Sep. 17, 2009

Related U.S. Application Data

(60) Provisional application No. 61/035,758, filed on Mar. 12, 2008.

(51) Int. Cl.
G10L 15/04 (2006.01)
(52) U.S. Cl. .............................. 704/254; 704/251
(58) Field of Classification Search .................. 704/254, 704/251
See application file for complete search history.

(56) References Cited

U.S. PATENT DOCUMENTS

| | | | |
|---|---|---|---|
| 6,073,094 A | 6/2000 | Chang et al. |
| 6,690,268 B2 | 2/2004 | Schofield et al. |
| 6,697,638 B1 | 2/2004 | Larsson et al. |
| 6,714,223 B2 | 3/2004 | Asami et al. |
| 6,812,888 B2 | 11/2004 | Drury et al. |
| 6,895,310 B1 | 5/2005 | Kolls |
| 6,944,679 B2 | 9/2005 | Parupudi et al. |
| 6,968,272 B2 | 11/2005 | Knockeart et al. |
| 6,970,703 B2 | 11/2005 | Fuchs et al. |
| 6,970,783 B2 | 11/2005 | Knockeart et al. |
| 7,050,834 B2 | 5/2006 | Harwood et al. |
| 7,113,911 B2 | 9/2006 | Hinde et al. |
| 7,228,224 B1 | 6/2007 | Rosen et al. |
| 7,286,857 B1 | 10/2007 | Walker et al. |
| 7,289,796 B2 | 10/2007 | Kudoh |
| 7,296,066 B2 | 11/2007 | Lehaff et al. |
| 7,346,374 B2 | 3/2008 | Witkowski et al. |
| 7,366,795 B2 | 4/2008 | O'Neil et al. |
| 7,400,879 B2 | 7/2008 | Lehaff et al. |
| 7,689,253 B2 | 3/2010 | Basir |
| 7,693,720 B2 | 4/2010 | Kennewick et al. |
| 2001/0056345 A1 | 12/2001 | Guedalia |
| 2002/0032042 A1 | 3/2002 | Poplawsky et al. |

(Continued)

FOREIGN PATENT DOCUMENTS

| EP | 1 575 225 A2 | 9/2005 |
|---|---|---|
| GB | 2 366 157 A | 2/2002 |

(Continued)

OTHER PUBLICATIONS

International Search Report for PCT Application No. PCT/CA2009/000309, Jun. 25, 2009.

(Continued)

*Primary Examiner* — Talivaldis Ivars Smits
(74) *Attorney, Agent, or Firm* — Carlson, Gaskey & Olds, P.C.

(57) ABSTRACT

A speech recognition system includes a mobile device and a remote server. The mobile device receives the speech from the user and extracts the features and phonemes from the speech. Selected phonemes, supplemental non-verbal information not based upon or derived from the speech, and measures of uncertainty are transmitted to the server, the phonemes are processed for speech understanding remotely or locally based, respectively, on whether or not the audible speech has a high or low recognition uncertainty, and a text of the speech (or the context or understanding of the speech) is transmitted back to the mobile device.

19 Claims, 2 Drawing Sheets

U.S. PATENT DOCUMENTS

| | | |
|---|---|---|
| 2002/0077811 A1 | 6/2002 | Koenig et al. |
| 2002/0193993 A1 | 12/2002 | Leviton et al. |
| 2004/0090950 A1 | 5/2004 | Lauber et al. |
| 2004/0107106 A1 | 6/2004 | Margaliot et al. |
| 2004/0145457 A1 | 7/2004 | Schofield et al. |
| 2004/0193420 A1 | 9/2004 | Kennewick et al. |
| 2004/0243406 A1 | 12/2004 | Rinscheid |
| 2005/0046584 A1 | 3/2005 | Breed |
| 2005/0054386 A1 | 3/2005 | Chung |
| 2005/0130631 A1 | 6/2005 | Maguire et al. |
| 2005/0131677 A1 | 6/2005 | Assadollahi |
| 2005/0135573 A1 | 6/2005 | Harwood et al. |
| 2005/0143134 A1 | 6/2005 | Harwood et al. |
| 2005/0266831 A1 | 12/2005 | Roth |
| 2005/0273327 A1 | 12/2005 | Krishnan |
| 2006/0030298 A1 | 2/2006 | Burton et al. |
| 2006/0052921 A1 | 3/2006 | Bodin et al. |
| 2006/0089754 A1 | 4/2006 | Mortenson |
| 2007/0260456 A1 | 11/2007 | Proux et al. |
| 2008/0140408 A1 | 6/2008 | Basir |
| 2010/0137037 A1 | 6/2010 | Basir |

FOREIGN PATENT DOCUMENTS

| | | |
|---|---|---|
| WO | 2007002753 A2 | 1/2007 |
| WO | 2007081929 A2 | 7/2007 |

OTHER PUBLICATIONS

International Search Report for PCT Application No. PCT/CA2006/000946, Nov. 8, 2006.

European Search Report for EP Application No. 06752782.0, Mar. 1, 2010.

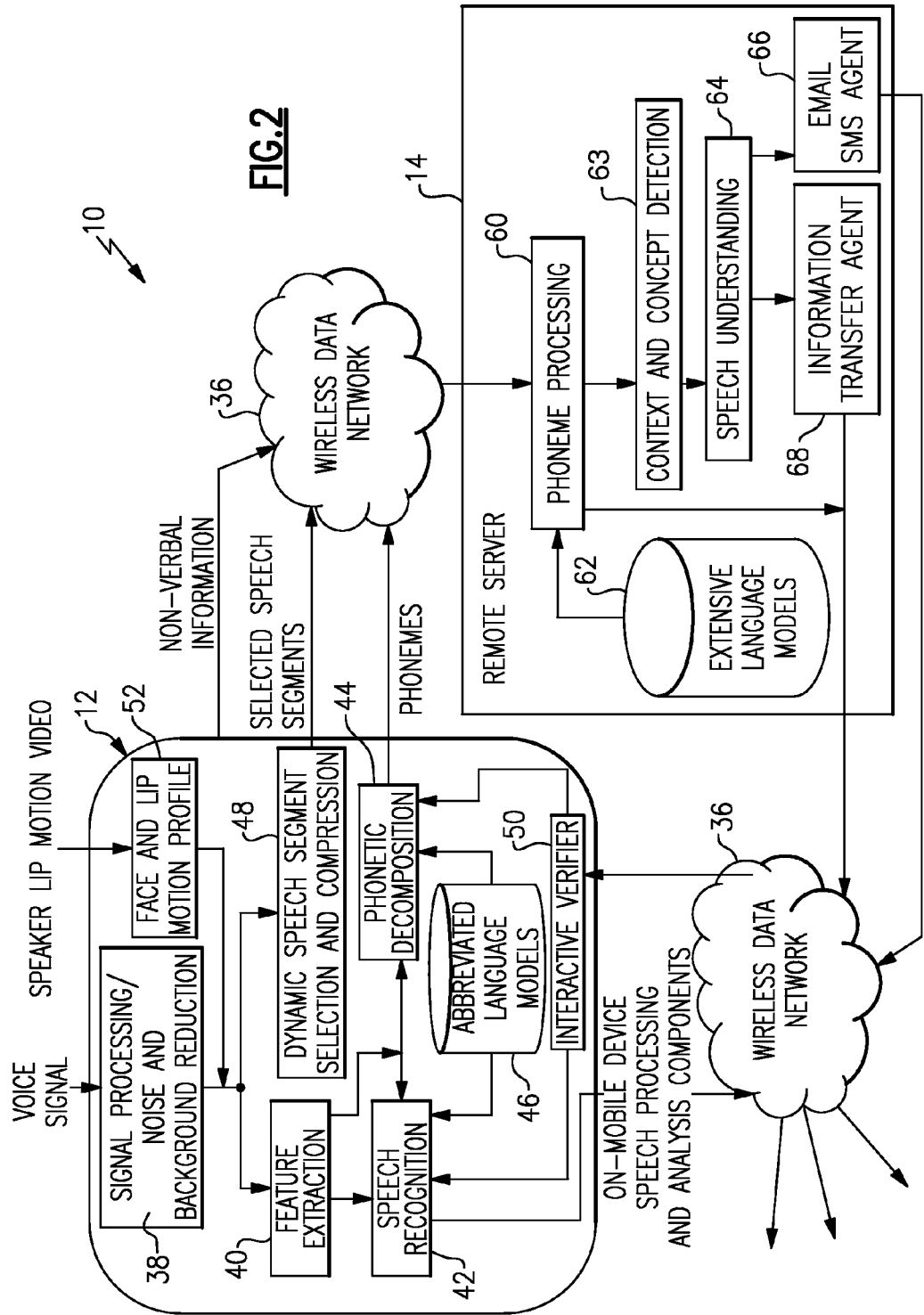

SPEECH UNDERSTANDING METHOD AND SYSTEM

This application claims priority to U.S. Provisional Application No. 61/035,758, filed Mar. 12, 2008.

BACKGROUND OF THE INVENTION

The present invention relates generally to speech recognition, and more particularly to recognition of speech received by mobile devices.

Mobile devices are becoming indispensable front-end to many speech applications. At the present time supporting speech recognition/understanding applications on a mobile device can take one of the following three forms.

Stand-alone Speech Recognition: Host all the speech to text software components on the mobile device. An example of such form is the one used by mobile phones and other mobile communication devices to enable voice dialing, etc. Due to mobile phone computational resource limitations such form is unable to provide reasonable performance even for the smallest speech utterance under the quietest operational conditions. Expanding or increasing the device resources to improve performance makes the device bulkier, more expensive, and causes the device to be less power efficient.

Remote Speech Recognition: To overcome mobile device resource limitations as a barrier to achieve high level of speech to text accuracy, the components of the speech recognition are hosted on a large server infrastructure that is reachable via a wireless network. The microphone on the mobile device is used to capture the user's spoken utterance. The voice utterance is coded and compressed and transmitted wirelessly to a server who applies a sequence of signal processing and speech recognition tasks to convert the speech signal into text. This approach is prone to the carrier signal quality such as signal fading, deterioration in speech signal caused by transmitter encoding, etc. Furthermore, transmitting speech signal over the wireless can be time consuming and air-time costly.

Distributed Speech Recognition: It is a hybrid of the two above forms where the recognition process is divided into two functional parts: a Front-End (FE) on the device and a Back End (BE) on a server. The Front-End transforms the digitized speech as a stream of feature vectors. These vectors are then sent to the Back-End via a data transport which could be wireless or wired. The recognition engine of the Back-End matches the sequence of input feature vectors with references and generates a recognition result. Again, while it is possible to having a local speech recognizer on future mobile devices, at present this would be a substantial additional cost due to processing power and memory restriction in current mobile devices. This issue is overcome by some current solutions by placing the computational and memory intensive parts at a remote server. Although that DSR both reduces the bandwidth requires and minimizes the distortion coming from the transmission errors over the cellular network, it still possible for distortion due to data truncation in the digitization and transportation process.

SUMMARY OF THE INVENTION

In the present invention, a speech recognition system includes a mobile device which receives audible speech from a user. The mobile device extracts features from the audible speech. The mobile device also extracts phonemes from the features. The mobile device then transmits the phonemes to a remote server for speech-recognition, such as speech-to-text processing.

Optionally, the mobile device also gathers supplemental, non-verbal information, such as parameters of the user's face and mouth, the context of the speech (such as a task being performed), and historical information (e.g. information regarding how prior perceived phonemes were previously translated in a manner that was accepted by the user). If the mobile device determines that the phonemes have a high recognition uncertainty, either based upon the phonemes themselves and/or in combination with the signal-to-noise ratio or other factors, the mobile device may also send the supplemental non-verbal information to the server for assistance in processing the phonemes.

BRIEF DESCRIPTION OF THE DRAWINGS

Other advantages of the present invention can be understood by reference to the following detailed description when considered in connection with the accompanying drawings wherein:

FIG. 2 is a functional schematic of the system of FIG. 1.

DETAILED DESCRIPTION OF THE PREFERRED EMBODIMENTS

Figure 1:
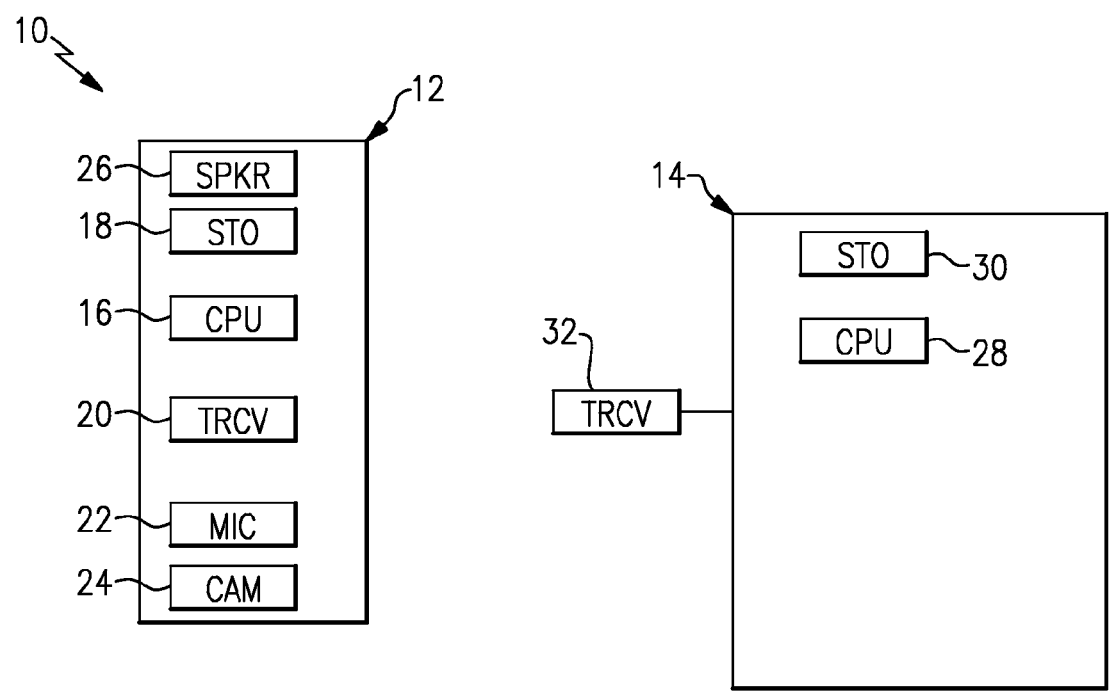
FIG. 1 is a high-level hardware schematic of a speech recognition according to one embodiment of the present invention.

One example speech recognition system 10 according to the present invention is shown in FIG. 1. The system 10 includes a mobile device 12 and a remote server 14. The mobile device 12 could be a mobile phone (cell phone, satellite phone, etc), "smart" phone or other portable communication system. The mobile device 12 could be installed in a vehicle.

The mobile device 12 includes a controller, such as processor 16 or other control circuitry, and storage 18, such as memory or other computer storage (RAM and/or ROM, or other electronic, optical, magnetic, etc storage). The mobile device 12 includes a transceiver 20 (i.e. a transmitter and/or receiver), such as a cell phone transceiver, satellite transceiver, wi-fi, or any other communication protocol. The mobile device 12 includes a microphone 22 for receiving audible speech signals from a person. An optional camera 24 is positioned to capture images (e.g. stills and/or video) of the person's mouth (such as next to the microphone 22 on a handheld cell phone, or directed toward the mouth of a driver in a vehicle system). A speaker 26 provides audible instructions or other communication from the mobile device 12 to the person. The storage 18 stores instructions which when executed by the processor 16, causes the processor 16 to perform the functions described herein as performed by the mobile device 12. The processor 16 and storage 18 receive information from the microphone 22, transceiver 20 and camera 24 as described further below.

The server 14 includes a processor 28 and storage 30. The server 14 communicates with the mobile device 12 via a complementary transceiver 32. The storage 30 stores instructions which when executed by the processor 28, causes the processor 28 to perform the functions described herein as performed by the server 14.

FIG. 1 is a simplified schematic, as many different configurations, with many additional hardware components, could be utilized.

FIG. 2 is a functional schematic of the speech recognition system 10. The mobile device 12 and server 14 communicate with one another via one or more wireless data networks 36 (and transceivers 20, 32; FIG. 1).

The mobile device 12 receives a voice signal (via microphone 22; FIG. 1), which is processed in module 38 for noise and background reduction. The feature extraction module 40 processes the filtered voice signal to extract "features" (i.e. the minimal constituents of language) from the audible speech. The features are sent to the speech recognition module 42 and a phoneme decomposition module 44, which extracts phonemes (i.e. the smallest posited linguistically distinctive unit of sound). In some cases, the speech recognition module 42 determines the context of the speech based upon the extracted features, the phonemes and the abbreviated language models 46.

The mobile device 12 further includes an interactive verifier module 50, which may, in performing some tasks, verify the context as processed by the system 10 with the user.

Images from the camera 24 (FIG. 1) of the user's face, mouth and lips are analyzed by the face and lip motion profile module 52 to form lip and mouth parameters. This information can be compared to the extracted phonemes. For example, if an extracted phoneme is the "o" sound but the parameters show that the user's mouth is closed or does not match the "o" sound, this could indicate high recognition uncertainty, or that the sound did not originate from the user. The parameters can also be used to distinguish two or more similar-sounding phonemes, but the images of the face and lip are different. This would facilitate selection of the proper phoneme. Lip parameters may be extracted to characterize both static (spatial) and dynamic (temporal) features. Static features may include directly visible information such as contour, geometry and positions of salient points, or features derived through various pattern recognition processes (PCA, HMM, NN). Dynamic features may include acceleration and motion of salient points, changes in geometry and contour, or features derived through less transparent pattern recognition processes (PCA, HMM, NN).

A dynamic speech segment selection and compression module 48 identifies speech segments (e.g. words or a series of words) with high recognition uncertainty based upon signal characteristics and extracted phonemes. For example, speech segments could be determined to have high recognition uncertainty based upon signal to noise ratio as determined by module 38, based upon the inability to match phonemes with the abbreviated language models 46, based upon interactions with the user (e.g. many corrections by the user) and/or based upon a mismatch between images of the user's face and lips and the extracted phonemes.

The server 14 includes a phoneme processing module 60 to process the phonemes received from the mobile device 12 to help determine the context and concepts they represent. The context is determined based upon surrounding phonemes, based upon supplemental information from the mobile device, and based upon extensive language models 62. The extensive language models 62 are much more complete and extensive than the abbreviated language models 46 on the mobile device, which is facilitated by the significantly higher processing power and storage of the server 14 than the mobile device 12. The extensive language models 62 also benefit from recent refinement, updates, and influences from aggregate information collected from sources including mobile devices. The context and concept detection module 63 on the server 14 determines the context based upon either the phonemes received from the mobile device 12 and/or the phonemes extracted by the server 14 on the selected speech segments transmitted by the dynamic speech segment selection and compression module 48 on the mobile device 12. The speech understanding module 64 derives the meaning of the processed speech and optionally converts the speech to text or a command. If sent by the mobile device 12 for high recognition uncertainty speech, the server 14 also processes the supplemental, nonverbal information received from the mobile device 12, such as the context of the speech (e.g. is the user providing commands, navigation information, generating a message about a certain topic), or based upon previous words and concepts used by the user. The supplemental information is valuable to influence decisions to reduce the uncertainty of the resulting concepts. The context or the text of the speech can be sent back to the mobile device 12 by the information transfer agent 68 of the server 14. Alternatively, if the speech was created for the purpose of generating a message to a third party, the text of the speech can be sent directly by the server 14 to the third party by an email/SMS agent 66 on the server 14. To facilitate accurate audible reproduction of homonyms and other uncertainties, additional information can be optionally transferred along with, or in place of, the transmitted text.

In use, the mobile device acquires the speech signal via the microphone 22 (FIG. 1) and processes it to reduce noise in module 38 (FIG. 2). During the utterance of the speech, images (video) of the mouth area of the user are acquired by the camera 24 (FIG. 1) and sent to the face and lip motion profile module 52. Features of the speech are extracted in the feature extraction module 40. Phonemes are extracted from the features and if needed, the lip motion information can be utilized to assist in extracting phonemes. Note that the phoneme representation is language independent. The phonemes are then coded for transmission to the server 14. If the mobile device 12 itself, cannot recognize the speech with high recognition certainty, the phonemes are transmitted to the server 14 via the transceiver 20 (FIG. 1) or optionally via a wired connection Speech segments with high recognition uncertainty are identified based upon the signal characteristics (e.g. S/N ratio) and based upon the extracted phonemes and optionally based upon a comparison with the images of the mouth area. The extracted phonemes are used to help determine the context of the speech. Information about the current task being performed by the user (e.g. navigation, email, commands to a system, etc.), language, and historical patterns of behavior may also help define context. The mobile device determines if speech understanding can be accomplished on the device 12 based upon preprocessing of the speech signal and the extracted phonemes. If the decision is that the understanding has to be performed on the server 14, the coded phonemes are transmitted to the server 14. If desirable, the extracted high recognition uncertainty speech segments are also transmitted in addition to (optionally) the supplemental, non-verbal information. The mobile device 12 may decide that understanding has to be performed on the server 14 based upon the level of uncertainty, or based upon previous uncertainty (e.g. uncertainty of speech recognition in the past ten minutes or some other time period) or historical data (e.g. if there have been many corrections by the user via the interactive verifier 50).

If the decision is that the speech understanding task can be performed on the mobile device 12, the extracted phonemes and the context are employed to translate the speech into text. A machine produced speech copy of the speech utterance is also computed from the phonemes. This can be used in the applications where the speech signal is to be presented to a user or who is interested in the audio form of the speech and not the text ("speech to speech"). In this case, homonyms to do not need to be resolved. This can be stored as a machine readable set of phonemes. This can be used to send a message between two people in an audible form, but with significantly reduced bandwidth. This can also be used in the context of a machine translation between languages, where the machine translation can be performed directly on the phonemes.

The interactive verifier 50 performs an automatic and interactive speech understanding verification algorithm after receiving a text of the speech from the server 14. This text is translated to speech and the resulting speech is first compared to the original speech signal within the mobile device 12. Discrepancies are identified and they are either corrected by the mobile device 12 or sent back to the server 14 so that the server 14 can perform the appropriate corrections on the text. Alternatively, the computed speech from text signal is presented audibly to the user. The user listens to the computed speech to determine if the server 14 understanding of the user's speech is correct. If the user determines that the server 14 made a mistake in the translation of the user's speech signal, the user can interrupt the verifier 50 to signify that there is an error in the translation. In this case, the user can utter the mistaken word again. For example, if the server 14 mistakenly produced the word "general" while the correct word is "central," the user can say "central as in center." The user feedback is used by the mobile device 12 to make the corrections. It is also possible to cause the mobile device 12 to send the feedback to the server 14, which in turn performs the correction and the revised text is sent again to the mobile device 12 for verification. The interactive verifier 50 performs this verification algorithm whether the speech-to-text translation is performed on the mobile device 12 or on the server 14.

In some implementations, features sent from the mobile device 12 to the server 14 may be selected to reduce the ability for the message to be reconstructed in its entirety by a single party. This involves distributing information across multiple distinct servers 14 and/or salting (injection of extra data) the features in a manner that allows the process to be reversed after the output text information is received by the mobile device. It can also involve an iterative process—starting with the delivery of a small subset of uncertain features to the server 14. If results from the small subset are sufficient to complete the speech to text conversion on the mobile device 12, the remainder of the uncertain information does not need to be delivered to the server.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps are for convenient reference in dependent claims and do not signify a required sequence of performance unless otherwise indicated in the claims.

What is claimed is:

1. A mobile device including:
   a transducer for receiving audible speech;
   a phonetic decomposition module extracting phonemes based upon the audible speech received by the transducer;
   a controller collecting and sending supplemental, non-verbal information relating to the audible speech but not based upon or derived from the audible speech; and
   a transmitter for sending the phonemes and the supplemental, non-verbal information.

2. The mobile device of claim 1 further including a receiver for receiving information generated based upon the phonemes transmitted by the transmitter.

3. The mobile device of claim 1 wherein the controller determines whether the audible speech has a high recognition uncertainty.

4. The mobile device of claim 3 wherein the controller sends via the transmitter supplemental, non-verbal information based upon the determination that the audible speech has high recognition uncertainty.

5. The mobile device of claim 4 wherein the supplemental, non-verbal information includes images of a mouth of a person who is speaking the audible speech.

6. The mobile device of claim 3 wherein the controller sends the phonemes via the transmitter based upon the determination that the audible speech has high recognition uncertainty.

7. The mobile device of claim 3 wherein the mobile device processes the phonemes based upon a determination that the audible speech does not have high recognition uncertainty, and sends the phonemes based upon the determination that the audible speech has high recognition uncertainty.

8. A speech recognition system including the mobile device of claim 1 further including a server receiving the phonemes from the transmitter, the server processing the phonemes to determine context.

9. The speech recognition system of claim 8 wherein the server sends information to the mobile device based upon the context of the phonemes.

10. The speech recognition system of claim 9 wherein the server determines context based upon the phonemes and based upon supplemental, non-verbal information.

11. The speech recognition system of claim 10 wherein the supplemental, non-verbal information includes a current task.

12. The speech recognition system of claim 10 wherein the supplemental, non-verbal information includes historical behavior patterns.

13. The speech recognition system of claim 10 wherein the mobile device decides whether the transmitter will send supplemental, non-verbal information based upon a determination of whether the audible speech has high recognition uncertainty.

14. The speech recognition system of claim 13 wherein the supplemental, non-verbal information includes parameters of a mouth of a person who is speaking the audible speech.

15. A method for processing audible speech including the steps of:
   acquiring a speech signal;
   acquiring supplemental, non-audible information relating to the speech signal, wherein the supplemental, non-audible information is not based upon or derived from the speech signal;
   processing the speech signal to generate phonemes; and
   transmitting the phonemes and the non-audible information to a remote location.

16. A method for processing audible speech including the steps of:
   receiving phonemes extracted from audible speech at a location remote from a person speaking the audible speech;
   receiving supplemental, non-verbal information regarding the person speaking the audible speech, wherein the supplemental, non-verbal information is not based upon or derived from the audible speech;
   processing the phonemes and the non-verbal information to determine context; and transmitting information to the remote location based upon the context.

17. A speech recognition system including:

a transducer for receiving audible speech;

a phonetic decomposition module extracting phonemes based upon the audible speech received by the transducer;

a transmitter for sending the phonemes; and a controller for determining whether the audible speech has a high recognition uncertainty, wherein the controller processes the phonemes locally based upon a determination that the audible speech does not have high recognition uncertainty, and the controller transmits the phonemes to be processed via the transmitter based upon a determination that the audible speech has high recognition uncertainty.

18. The speech recognition system of claim 17 wherein the controller transmits the phonemes to a remote server via the transmitter based upon the determination that the audible speech has high recognition uncertainty, the system further including the server.

19. The speech recognition system of claim 18 wherein the controller transmits via the transmitter supplemental, non-verbal information based upon the determination that the audible speech has high recognition uncertainty.

* * * * *